(12) United States Patent
Singer et al.

(10) Patent No.: US 9,884,605 B2
(45) Date of Patent: *Feb. 6, 2018

(54) FORCE-LIMITING DEVICE FOR A SEAT BELT SYSTEM

(71) Applicant: Autoliv Development AB, Vårgårda (SE)

(72) Inventors: Klaus-Peter Singer, Hamburg (DE); Ronald Jabusch, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 372 days.

This patent is subject to a terminal disclaimer.

(21) Appl. No.: 14/421,701

(22) PCT Filed: Aug. 2, 2013

(86) PCT No.: PCT/EP2013/002307
§ 371 (c)(1),
(2) Date: Feb. 13, 2015

(87) PCT Pub. No.: WO2014/026740
PCT Pub. Date: Feb. 20, 2014

(65) Prior Publication Data
US 2015/0203070 A1    Jul. 23, 2015

(30) Foreign Application Priority Data

Aug. 15, 2012   (DE) .................. 10 2012 214 521

(51) Int. Cl.
*B60R 22/34* (2006.01)
*B60R 22/38* (2006.01)

(52) U.S. Cl.
CPC .......... *B60R 22/34* (2013.01); *B60R 22/3413* (2013.01); *B60R 22/38* (2013.01)

(58) Field of Classification Search
CPC ...... B60R 22/34; B60R 22/38; B60R 22/3413
See application file for complete search history.

(56) References Cited

U.S. PATENT DOCUMENTS 3,442,466 A    5/1969  Fritsche
4,206,887 A    6/1980  de Rosa
(Continued)

FOREIGN PATENT DOCUMENTS

CN    WO 2004/096611 A1    11/2004
DE    296 14 587 U1          2/1997
(Continued)

OTHER PUBLICATIONS

PCT International Search Report—Oct. 17, 2013.
(Continued)

*Primary Examiner* — Sang K Kim
(74) *Attorney, Agent, or Firm* — Brinks Gilson & Lione

(57) ABSTRACT

A force-limiting device (4) for a seat belt device which has at least two parts (5, 11, 15) controlled with a frequency-dependent, defined movement, wherein the parts (5, 11,15) moving relative to one another feature gearings (8, 10, 18, 19) engaging into each other and the frequency-dependent, controlled movement occurs such that at least one of the parts (5, 11, 15) executes a feed movement (V) with respect to the other part (5, 11,15) with an undulating motion (Q) perpendicular to the feed movement (V) in which the gearings (8, 10, 18, 19) alternatingly engage and disengage, by means of which a force limited belt extraction is facilitated. Wherein means are provided with which the required force for movement of the parts (5, 11, 15) toward one another can be automatically increased after a preset belt extraction length.

16 Claims, 4 Drawing Sheets

(56) References Cited

U.S. PATENT DOCUMENTS

| | | | |
|---|---|---|---|
| 4,323,205 | A | 4/1982 | Tsuge et al. |
| 4,483,494 | A | 11/1984 | Takada |
| 4,749,142 | A | 6/1988 | Saitow |
| 4,943,011 | A | 7/1990 | Kitamura |
| 5,601,251 | A | 2/1997 | Hishon et al. |
| 5,636,806 | A | 6/1997 | Sayles |
| 5,769,345 | A | 6/1998 | Morner et al. |
| 6,098,722 | A | 8/2000 | Kimmig et al. |
| 6,260,781 | B1 | 7/2001 | Smithson et al. |
| 6,260,782 | B1 | 7/2001 | Smithson et al. |
| 6,871,813 | B2 | 3/2005 | Bae |
| 7,210,645 | B2 | 5/2007 | Paterson et al. |
| 7,631,830 | B2 | 12/2009 | Boelstler et al. |
| 7,980,503 | B2 | 7/2011 | Saito et al. |
| 8,473,162 | B2 | 6/2013 | Jabusch |
| 2002/0050542 | A1 | 5/2002 | Nagata et al. |
| 2002/0190515 | A1 | 12/2002 | Birk et al. |
| 2005/0059524 | A1 | 3/2005 | Hori et al. |
| 2005/0133330 | A1 | 6/2005 | Stiefvater |
| 2006/0208126 | A1 | 9/2006 | Hiramatsu et al. |
| 2008/0105778 | A1 | 5/2008 | Benner |
| 2008/0191083 | A1 | 8/2008 | Sumiyashiki |
| 2011/0172054 | A1* | 7/2011 | Jabusch .................. B60R 19/36 475/331 |

FOREIGN PATENT DOCUMENTS

| | | |
|---|---|---|
| DE | 201 10 423 U1 | 11/2001 |
| DE | 202 07 276 U1 | 10/2002 |
| DE | 202 09 965 U1 | 10/2002 |
| DE | 10 2005 016 822 B3 | 1/2007 |
| DE | 10 2006 003 353 A1 | 7/2007 |
| DE | 10 2008 010 431 A1 | 9/2009 |
| DE | 10 2008 049 931 A1 | 5/2010 |
| DE | 10 2009 010 435 A1 | 9/2010 |
| DE | 10 2009 101 435 A1 | 9/2010 |
| DE | 10 2009 024 292 A1 | 12/2010 |
| DE | 10 2010 050 189 A1 | 5/2012 |
| DE | 10 2011 008 405 A1 | 7/2012 |
| DE | 10 2011 101515 A1 | 11/2012 |
| EP | 1 069 009 A1 | 1/2001 |
| EP | WO 2003/020557 A1 | 3/2003 |
| EP | 1 222 097 B1 | 2/2004 |
| EP | WO 2006/198451 A1 | 10/2006 |
| EP | WO 2010/139433 A1 | 12/2010 |
| FR | 2 528 928 | 6/1982 |
| WO | WO 1996/032303 A1 | 10/1996 |
| WO | WO 2006/108451 A1 | 10/2006 |
| WO | WO 2007/130041 A1 | 11/2007 |
| WO | WO 2010/037460 A2 | 4/2010 |

OTHER PUBLICATIONS

German Examination Report—Apr. 15, 2013.
PCT International Search Report and Written Opinion of PCT/EP2014/071867 dated Dec. 15, 2014 (English Translation).
PCT International Search Report of PCT/EP2013/002307 dated Oct. 17, 2013 (English Translation).

* cited by examiner

FORCE-LIMITING DEVICE FOR A SEAT BELT SYSTEM

CROSS REFERENCE TO RELATED APPLICATIONS

This application claims priority to German Patent Application No. 10 2012 214 521.4, filed Aug. 15, 2012 and PCT International Patent Application No. PCT/EP2013/002307, filed on Aug. 2, 2013.

FIELD OF THE INVENTION

The invention relates to a force-limiting device for a belt retractor for a seat belt system.

BACKGROUND

Known from WO 2006/108451 A1, for example, is a speed-regulated force-limiting device for a seat belt retractor which features several masses, which are positioned on the frame of the seat belt retractor and are to be put in oscillatory motion. The masses are mounted on the retractor frame so as to rotate and alternatively engage with two teeth during the force-limited seat belt extraction into a gear ring connected to the belt shaft. Overall the seat belt retractor is complicated and expensive to manufacture because of the oscillating masses positioned on the retractor frame. Furthermore, because of the oscillating masses, the seat belt retractor requires a relatively large installation space.

An improved force-limiting device operating on the basis of the same physical principle is described in German Patent Application DE 10 2008 049 931.5, in which two toothed parts are moved in a force-limited manner toward one another and one of the parts thereby executes an undulating feed motion during which the toothed parts alternatingly engage and disengage. The oscillating masses are replaced in this embodiment by the part executing the undulating feed movement, so that the force-limiting device described there requires an essentially smaller installation space and has a substantially simpler design. In one embodiment, the part executing the undulating feed movement is in the form of a toothed disc which can be connected in a friction-locking manner to the belt shaft. Between the toothed disc and the part against which the toothed disc executes the feed movement, a spring washer can be provided which exerts an axial compression force on the toothed disc, whereupon the force-limiting level of the force-limiting characteristic is increased.

The force-limiting level of the force-limiting device automatically results from the kinetic energy of the passengers during forward displacement, which must be reduced, wherein the basic characteristic of the force-limiting path is strictly determined by the parameters of the toothed disc, such as the number of teeth, the separation of the teeth, the mass of the toothed disc and by the spring characteristics of the spring washer.

There are legal requirements, however, such as US requirements for restraining forces for passengers in the back seats, which mandate an increase of the restraining forces to a higher force-limiting level after a preset seat belt extraction. Such a force-limiting characteristic is not obtainable with one of the above force-limiting devices.

The object of the invention is to create a force-limiting device of this type which enables a progressive force-limiting course of the restraining forces and can be constructed simply.

INTRODUCTORY DESCRIPTION

The above-described object the invention a force-limiting device as described herein is provided.

According to the basic idea of the invention, it is proposed that means be used that automatically increase the force required to move parts toward one another after a preset belt extraction length. The advantage of the proposed solution can be seen in the fact that the force-limiting level of the force-limiting characteristic is automatically increased in the proposed solution solely by movement after a preset belt extraction length. The advantage is thereby used that the force-limiting level of the force-limiting device can be changed solely by the force of the parts movable with respect to each other, since this forms one of the definitive energy dissipation parameters underlying the force-limiting device. Thus the parts themselves need not be changed in order to change the oscillatory behavior and the force-limiting level. Here it is especially important that the force can be automatically changed after a preset belt extraction length, so that external control is not needed.

It is further proposed that the means be formed by an open, wavelike spring washer. The use of an open spring washer is advantageous, since the parts moving toward one another can in particular be simply impacted with a changing spring force during the movement. This can occur, for example, by expanding the spring washer, so that it exerts a different spring force. In addition, the spring washer can also be displaced such that it changes its course during the movement and, for example, is transferred from one large winding into a course with several spiral windings.

It is further proposed that two of the parts moving toward one another be provided with stop surfaces, with which the spring washer can come into contact with its open ends for attachment during the movement. By attachment of the open ends on the stop surfaces, the deformation behavior and thus also the spring force can be actively changed after a preset belt extraction length, wherein the stop surfaces are purposely associated with the parts moving toward one another, so that their movement toward one another and thus the exceedance of a preset belt extraction length are the cause for the change of the force-limiting level. After contact of the open ends with the stop surfaces, the spring washer is expanded by the exertion of compression forces, whereupon the undulation of this spring washer is purposely reinforced or the spring washer bends to the side. The spring force acting between the parts moving toward one another and the force-limiting level are automatically increased by the reinforced undulation or side bend.

It is further proposed that the ends of the spring washer be angled in the direction of the parts moving toward one another, and the parts moving toward one another have pockets in which the stop surfaces are provided. The advantages of the proposed solution can be seen in that the ends of the spring washer automatically slide into the pockets after a preset belt extraction length because of their shape and spring characteristics and contact the stop surfaces for attachment. The pockets are thereby advantageously designed to have a shape identical to that of the angled ends, so that the ends rest therein over as large a circumferential area as possible and are supported as well as possible during further movement. The pockets are designed as inclined recesses corresponding to the outward angled ends so that the angled ends may be received in the pockets corresponding to their shape, and the spring washer again has a level course in its area between the ends and rests on both sides on as large an area as possible on both of the parts that are moved toward one another.

It is alternatively recommended that one end of the spring washer be firmly connected to one of the parts in the direction of motion of the parts moving toward one another, and that it have a spiral course starting from one end. By means of the rigidly held end and the spiral course of the spring washer, the spring washer can be coiled during the movement into several windings resting on each other, wherein the spring force exerted to the side, e.g. by the reinforcement of the undulation or by a side bulge of the windings, is increased.

In addition it is recommended that a spiral guide track be provided into which the spring washer can be inserted. In another preferred embodiment, said guide track is formed by a groove. By means of the spiral guide track, the course of the spring washer into which the latter is transported is in practice preset. This ensures that movement in an uncontrolled manner is impeded by clamping of the spring washer, causing the force-limiting level to be undesirably increased to too high a level. To that end a groove, in particular, is suitable, since the spring washer can be guided therein especially well and continuously.

The groove can thereby feature a decreasing depth in the direction of movement of the open end so that the compression force exerted by the spring washer between the two parts and thus the force-limiting level can also be increased with an increasing belt extraction length.

It is alternatively proposed that the means be formed by a cam structure positioned on one of the parts moving toward one another by means of which the force required for movement of the parts toward one another after a preset belt extraction length can be changed. Contact areas are purposely created by means of the cam structure on the parts moved toward one another, causing the parts to come in contact with one another after a preset belt extraction length, whereupon the motion behavior and in particular the oscillatory behavior and associated force-limiting level are changed.

BRIEF DESCRIPTION OF THE DRAWINGS

The invention will be explained in the following using preferred embodiments with reference to the attached figures. These show.

FURTHER DESCRIPTION OF THE INVENTION

Figure 1:
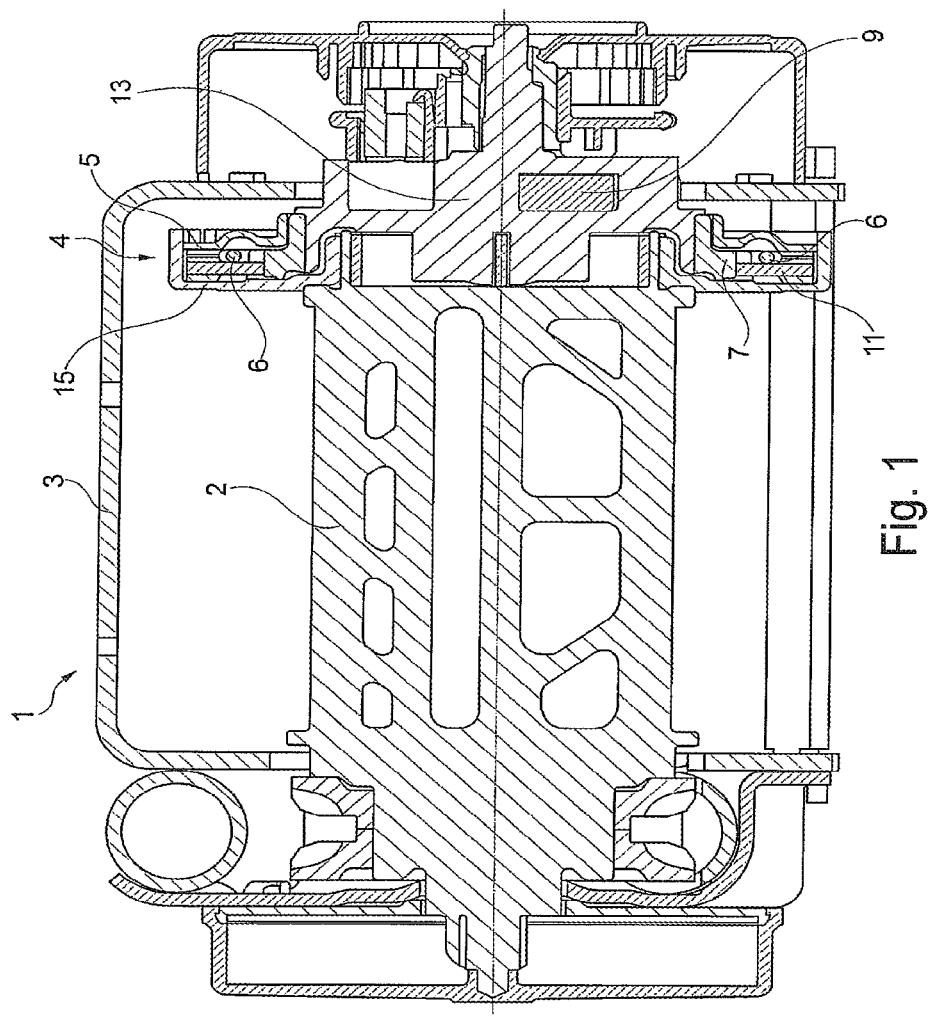
FIG. 1 shows a belt retractor with an inventive force-limiting device.

FIG. 1 shows a belt retractor 1 of a seat belt system with a belt shaft 2 mounted in a retractor frame 3, on which frame 3 an inventively constructed force-limiting device 4 is positioned. In addition a profile head 13 is provided, which is the carrier of a locking ratchet 9 which is actuated when a preset belt extraction acceleration or a preset vehicle deceleration is exceeded, and locks the profile head 13 firmly to the vehicle in a gearing of the retractor frame 3.

Figure 3:
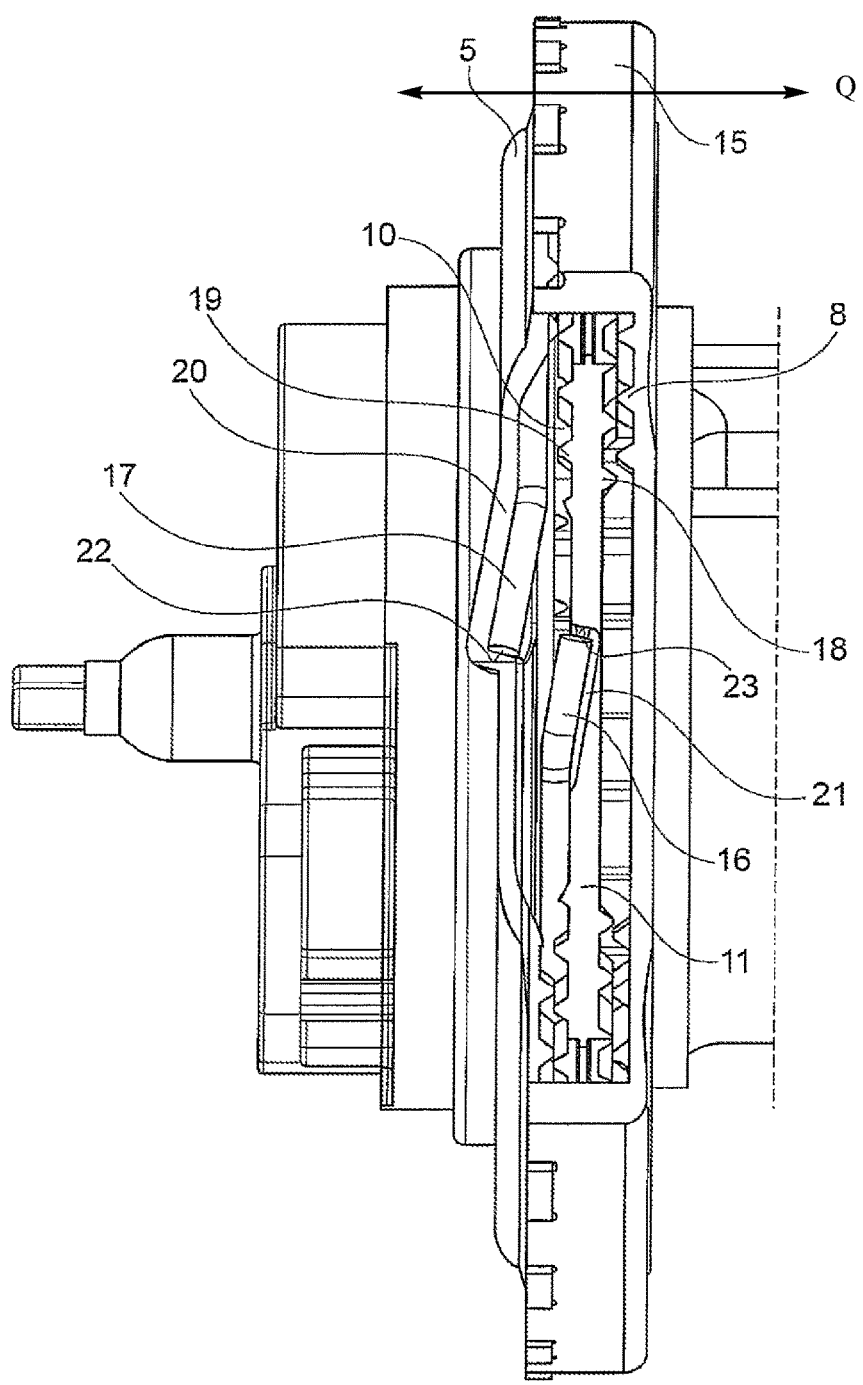
FIG. 3 is a side view of a cutaway force-limiting device.

The force-limiting device 4 encompasses in its basic construction two fixed parts 5 and 15 with a movable part 11 between the fixed parts 5 and 15. The part 15 simultaneously forms the housing of the force-limiting device 4 and is connected in a rotationally fixed manner to the belt shaft 2. On its radial exterior the part 15 has axially aligned fingers between which the part 5 engages with radially protruding fingers 25 and thus is also connected in a rotationally fixed manner with part 15 and thus also with the belt shaft 2. The movable part 11 is guided with a radially inward gearing 26 in an axially displaceable manner on an annular gear 7 and is simultaneously connected in the circumferential direction in a rotationally fixed manner to the annular gear 7. The annular gear 7 is in turn connected in a rotationally fixed manner to the profile head 13, so that the part 11 with a blocked profile head 13 is to be viewed as likewise blocked in the circumferential direction. The fixed parts 5 and 15 are respectively provided with annular, axially aligned gearings 10 and 8, as can be seen in FIG. 3. The gearing 10 on part 5 and the gearing 8 on part 15 are each positioned such that they are opposite the ring-shaped, axially aligned gearing 18 or 19 positioned on the movable part 11. The separation between the movable part 11 and the fixed parts 5 and 15 in the axial direction is selected in each case such that at least one pair of opposite gearings 10 and 19 and/or 18 and 8 are engaged. Fixed parts 5 and 15 are referred to as fixed in the sense that they are fixed to one another, and to belt shaft 2, but do undergo rotation relative to the retractor frame 3.

Figure 2:
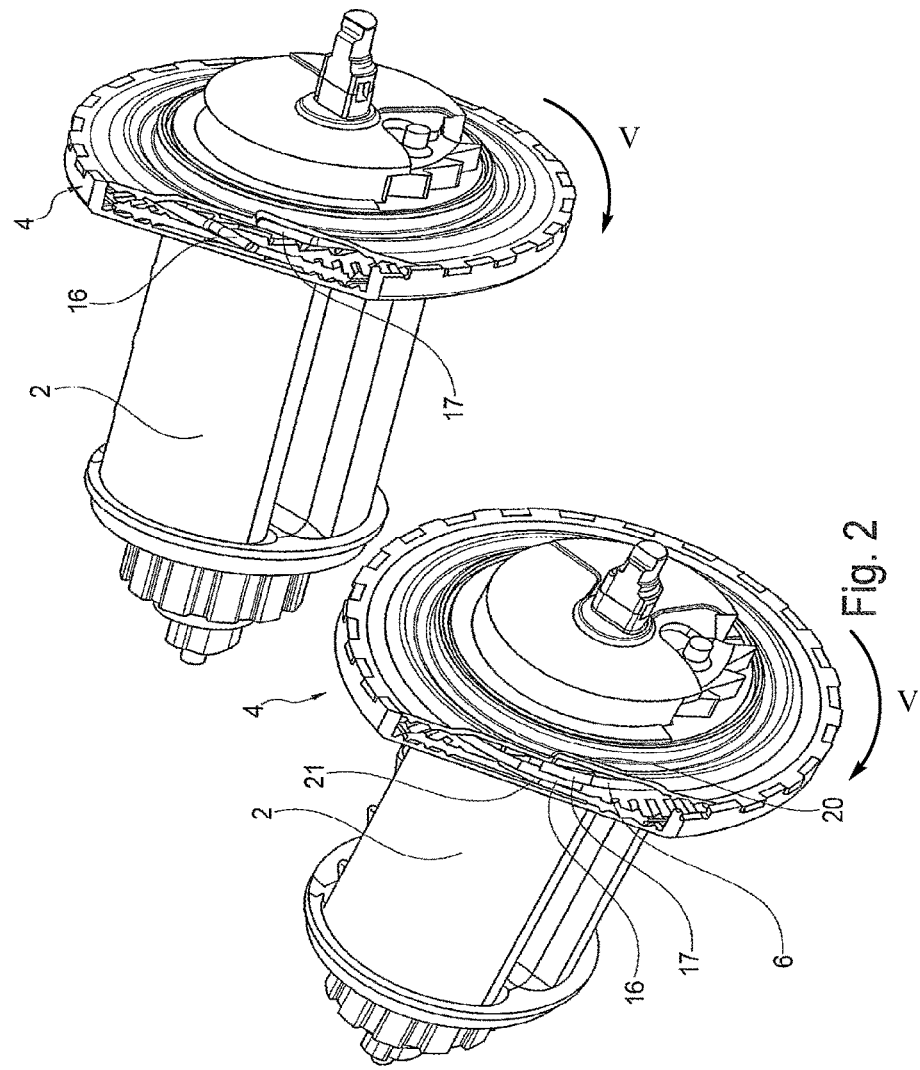
FIG. 2 is an oblique view of a belt shaft with a cutaway force-limiting device before and after activation of the force-limiting device.
Figure 4:
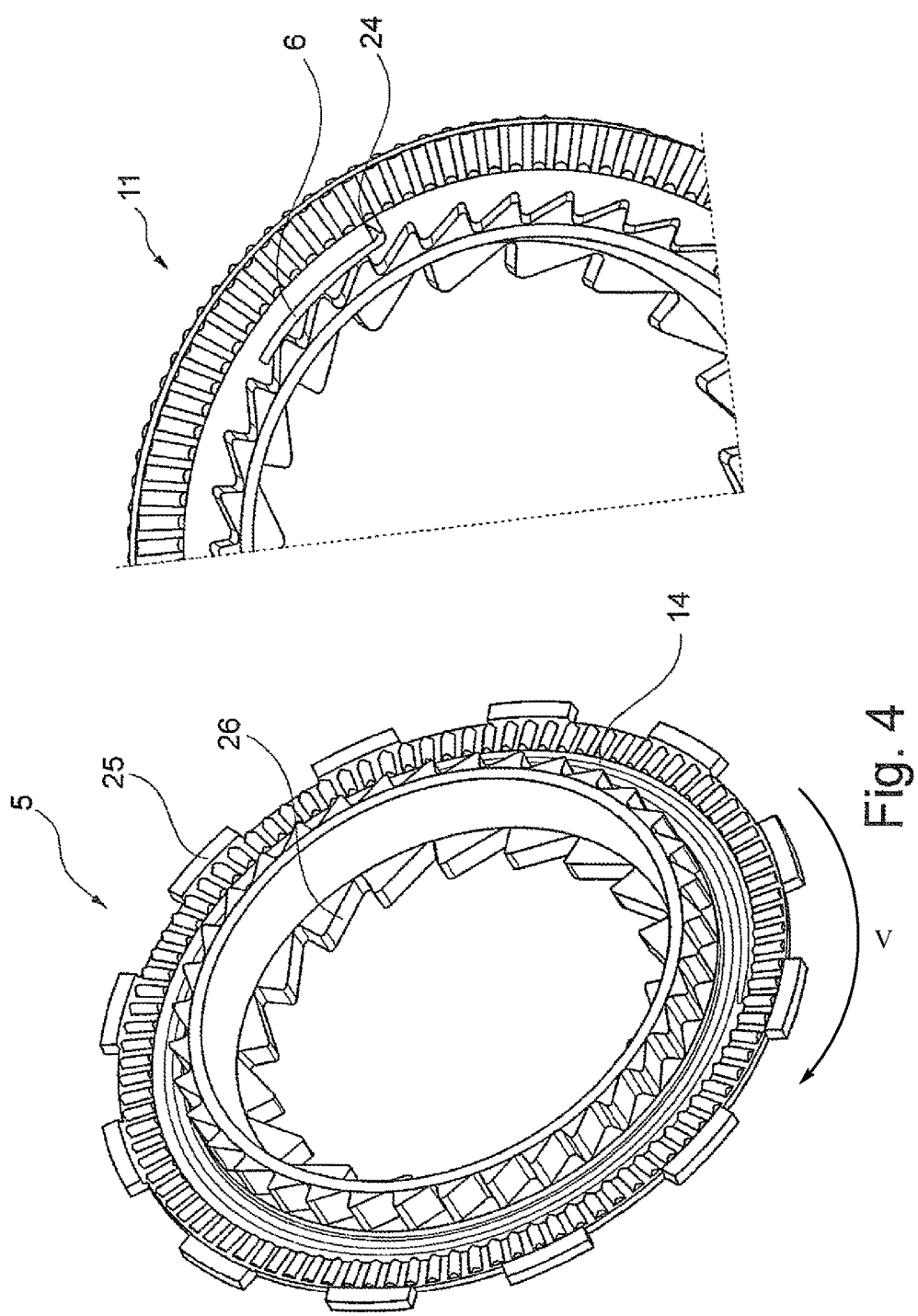
FIG. 4 shows an oscillating disc and a retaining disc with a spiral spring washer.

Upon actuation of the blocking device of the belt shaft 2, the locking ratchet 9 is extended and blocks the profile head 13 and thus the part 11 in the belt extraction direction. The force-limiting device 4 is activated by the belt extraction force acting in an accident during forward displacement of the passenger when the belt extraction force preset by the design of the force-limiting device 4 itself is exceeded. In the process, parts 15 and 5 are forced into a rotary movement, designated by arrow V, as shown in FIG. 2 and FIG. 4, with respect to part 11. Because of the pair-wise engagement of gearings 10 and 19 and 18 and 8 with each other, the part 11 is forced by the teeth flanks gliding past each other into an oscillatory movement in the axial direction, designated by arrow Q, as shown in FIG. 3, perpendicular to the feed movement of parts 15 and 5, during which it is periodically braked and accelerated. This oscillatory movement is the physical cause for the energy dissipation underlying the force-limiting device 4, which thus also determines the force-limiting level. The part 11 can also be termed an oscillating disc based on its motion—by means of its oscillatory motion it ensures the feed movement of parts 5 and 15 and thus the force-limited rotary motion of the belt shaft 2 in the belt extraction direction.

Between part 11 and part 5, an open undulating spring washer 6 is provided, which is supported on part 5 and pushes part 11 against part 15. Since part 11 must periodically overcome the axial spring force exerted by the spring washer 6 to perform the above-described oscillatory motion, the force-limiting level of the force-limiting device 4 is determined in the start phase and during the additional belt extraction movement by the spring force of the spring washer 6. For example, the belt extraction force in the start phase can be 3-4 kN.

The left image in FIG. 2 shows the belt shaft 2 with a cutaway force-limiting device 4. The spring washer 6 is open and has its free ends 16 and 17 lying over one another. The free ends 16 and 17 are angled to the side and thereby exert an additional axial force between parts 5 and 11. Pockets 20 and 21 in the form of inclined recesses are provided on part 11 and on part 5 respectively in the direction of rotation behind the ends 16 and 17, as can also be seen in FIG. 3. Upon activation of the force-limiting device 4, the parts 15 and 5 together with the belt shaft 2 rotate with respect to part 11, which is blocked in the circumferential direction, and the profile head 13. The force-limiting level is determined in this phase by the mass design of the system and the spring force of the spring washer 6. The spring washer 6 is stationary during the rotary motion of parts 15 and 5.

After the belt shaft 2 with parts 15 and 5 is rotated almost one full rotation, in this case a rotation of 340 degrees, with respect to part 11 and thus with respect to the spring washer 6, the end 17 slides automatically into the pocket 20 because of its outward bend and thereby is attached by its front to the stop surface 22 in the pocket 20. During the continuing rotation of part 5 the spring washer 6 is carried along via the stop surface 22, so that the end 16 completes a rotary motion with respect to part 11. During this movement the force-limiting level of the start phase continues to act. The end 16 then likewise slides after completion of almost one complete rotation, in this case likewise 340 degrees, into pocket 21 because of its outward bend and thereby also attaches to the front stop surface 23 of part 11, as can be seen in the right image of FIG. 2 and in FIG. 3. Starting at this position, the spring washer 6 is fixed in the circumferential direction with respect both to part 5 and to part 11, so that an additional rotary motion of part 5 with respect to part 11 and thus also of the belt shaft 2 with respect to the profile head 13 is only possible by means of a deformation of the spring washer 6. The spring washer 6 thereby rises and increases the axial compression force on part 11, such that the force-limiting level increases abruptly, in this case to above 6 kN. Thus with the invention using a force-limiting device 4 a progressive force-limiting course can be implemented with a shift point defined by the location of the pockets 20 and 21 with respect to the free ends 16 and 17 and the rotational angle consequently to be covered, which shift point in this embodiment corresponds to 680 degrees or about 1.9 revolutions. Depending on the mechanical characteristics, the shape and the arrangement of the spring washer, both the characteristics of the force-limiting increase as well as the extent of the force-limiting increase can be regulated. Both continuous and abrupt increases of the force-limiting level are thereby possible.

An alternative embodiment is shown in FIG. 4, in which the open spring washer 6 is suspended at one end 24 on part 11 and in the further course is guided in a spiral guide track 14 in the form of a groove on part 5, so that during the relative movement of the two parts 5 and 11 toward one another, the spring washer 6 is pushed into the groove. In the process the spring washer 6 stiffens because of insertion into the groove and coiling into several windings, and the compression force exerted on part 11 is thereby increased. In addition, an end stop can be provided which blocks any additional insertion and causes upward movement due to sideward bending of the spring washer 6. The compression force and the force-limiting level are increased by both effects, either continuously or abruptly depending on the shape and mechanical properties of the spring washer.

Furthermore, the means can be realized by a cam structure on one of the parts 5, 11 or 15 which starting at a certain rotational angle of the parts 5, 11 and 15 with respect to one another, come into contact at a mating surface of the respective opposite part 5, 11 or 15 and as a result change oscillatory behavior.

While the above description constitutes the preferred embodiment of the present invention, it will be appreciated that the invention is susceptible to modification, variation and change without departing from the proper scope and fair meaning of the accompanying claims.

The invention claimed is:

1. A force-limiting device for a seat belt device comprising at least two parts controlled with a frequency-dependent, defined movement, wherein the parts moving relative to each other have gearings engaging into each other and the frequency-dependent, defined movement occurs such that at least one of the parts executes a rotary feed movement with respect to another of the parts with an undulating movement in an axial direction perpendicular to the rotary feed movement in which the gearings alternatingly engage and disengage, an open, undulating spring washer acting with a changing spring force on the parts moving toward one another during the defined movement and providing a force-limited belt extraction, wherein a required force for movement of the parts toward one another increases after a preset belt extraction length.

2. The force-limiting device according to claim 1, further comprising in that stop surfaces are provided on two of the parts moving toward one another on which the spring washer comes into contact with open ends of the spring washer during the defined movement.

3. The force-limiting device according to claim 2, further comprising in that the open ends of the spring washer are each angled in the direction of the parts moving toward one another and the parts moving toward one another have pockets in which the stop surfaces are provided, and in that the open ends of the spring washer come into contact with the stop surfaces in the pockets after the preset belt extraction length.

4. The force-limiting device according to claim 2, further comprising in that one of the open ends of the spring washer is permanently connected to one of the parts, the spring washer having a spiral shape.

5. The force-limiting device according to claim 4, further comprising in that a spiral guide track is provided into which the spring washer can be inserted.

6. The force-limiting device according to claim 5, further comprising in that the spiral guide track is formed by a groove.

7. The force-limiting device according to claim 6, further comprising in that the groove has a decreasing depth in the direction of motion of one of the open ends of the spring washer.

8. The force-limiting device according to claim 1, in that a cam structure is formed and positioned on one of the parts moving relative to one another whereby the required force for movement of the parts can be changed after the preset belt extraction length.

9. A force-limiting device for a seat belt device comprising at least two fixed disc shaped parts fixed to one another forming a space therebetween with a movable disk shaped part positioned in the space, the movable disk shaped part rotatable with respect to the two fixed disc shaped parts in a controlled frequency-dependent, defined movement, wherein the fixed parts and the movable part each have gearings engaging into each other and the frequency-dependent, defined movement occurs such that at least one of the fixed or movable parts executes a rotary feed movement with respect to another of the fixed or movable parts, with the movable part undergoing an undulating movement in an axial direction perpendicular to the rotary feed movement in which the gearings alternatingly engage and disengage, a spring washer acting upon the movable part for providing a force-limited belt extraction, a surface interacting with the spring washer such that a required force for movement of the movable part with respect to the fixed parts increases after a preset belt extraction length of the seat belt device through an increase in the force exerted by the spring washer against the movable part.

10. The force-limiting device according to claim 9, further comprising in that the surface is formed as a stop surface provided on at least one of the fixed parts on which an open end of the spring washer come into contact with during the rotary feed movement.

11. The force-limiting device according to claim 10, further comprising in that the open end of the spring washer is angled in a direction of the parts and at least one of the fixed parts has a pocket with the stop surface and the open end of the spring washer automatically comes into contact with the stop surface in the pocket after the preset belt extraction length.

12. The force-limiting device according to claim 11, further comprising in that the spring washer has a pair of open ends with one of the open ends permanently connected to one of the fixed parts, the spring washer having a spiral shape.

13. The force-limiting device according to claim 12, further comprising in that the surface is provided in the form of a spiral guide track in at least one of the fixed parts into which the spring washer can be inserted.

14. The force-limiting device according to claim 13, further comprising in that the spiral guide track is formed by a groove.

15. The force-limiting device according to claim 14, further comprising in that the groove has a decreasing depth in the direction of motion of one of the open ends of the spring washer.

16. The force-limiting device according to claim 9, in that the surface is provided in the form of a cam structure positioned on one of the fixed parts whereby the required force for movement of the parts can be changed after the preset belt extraction length.

* * * * *